United States Patent Office 3,533,701
Patented Oct. 13, 1970

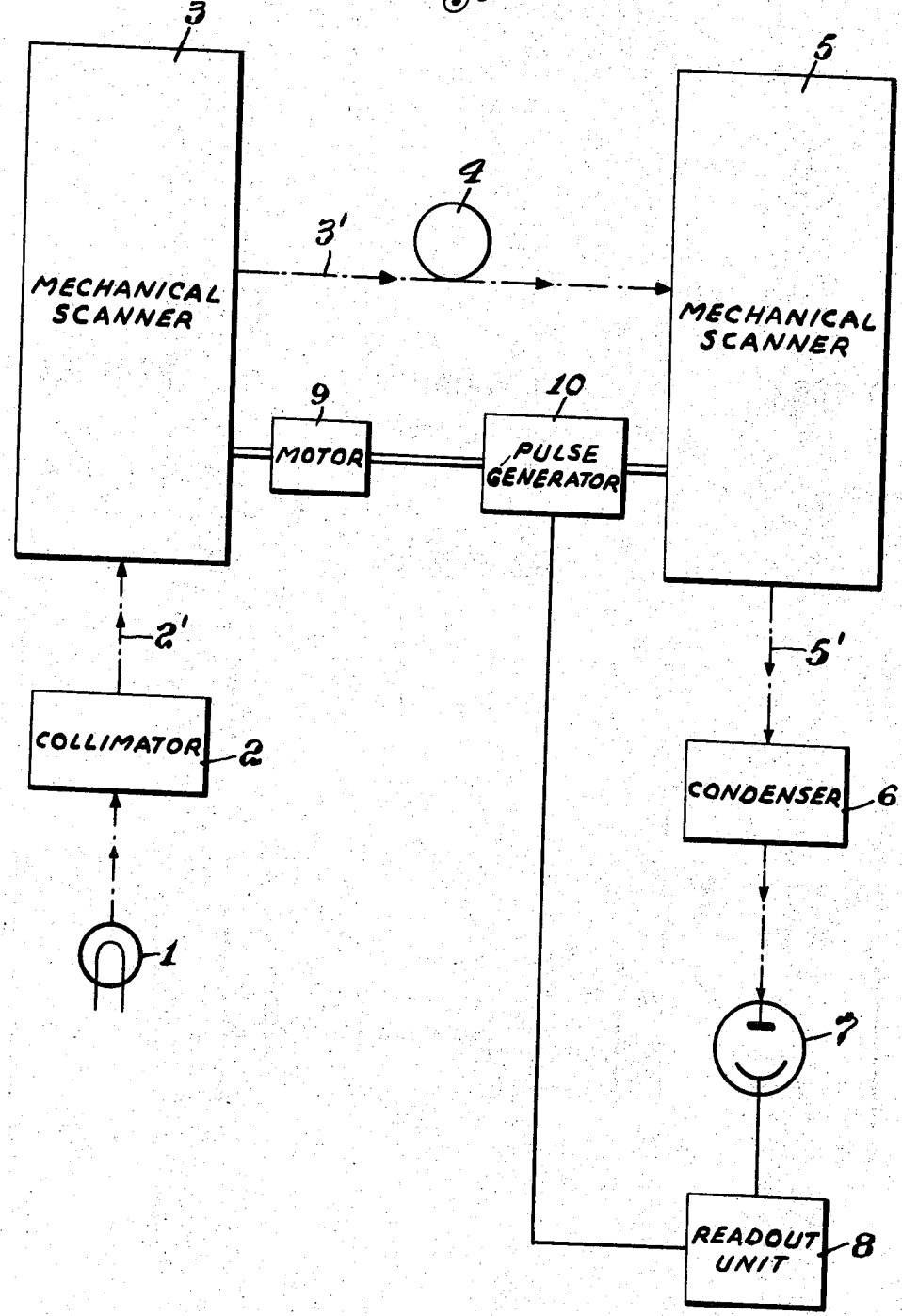

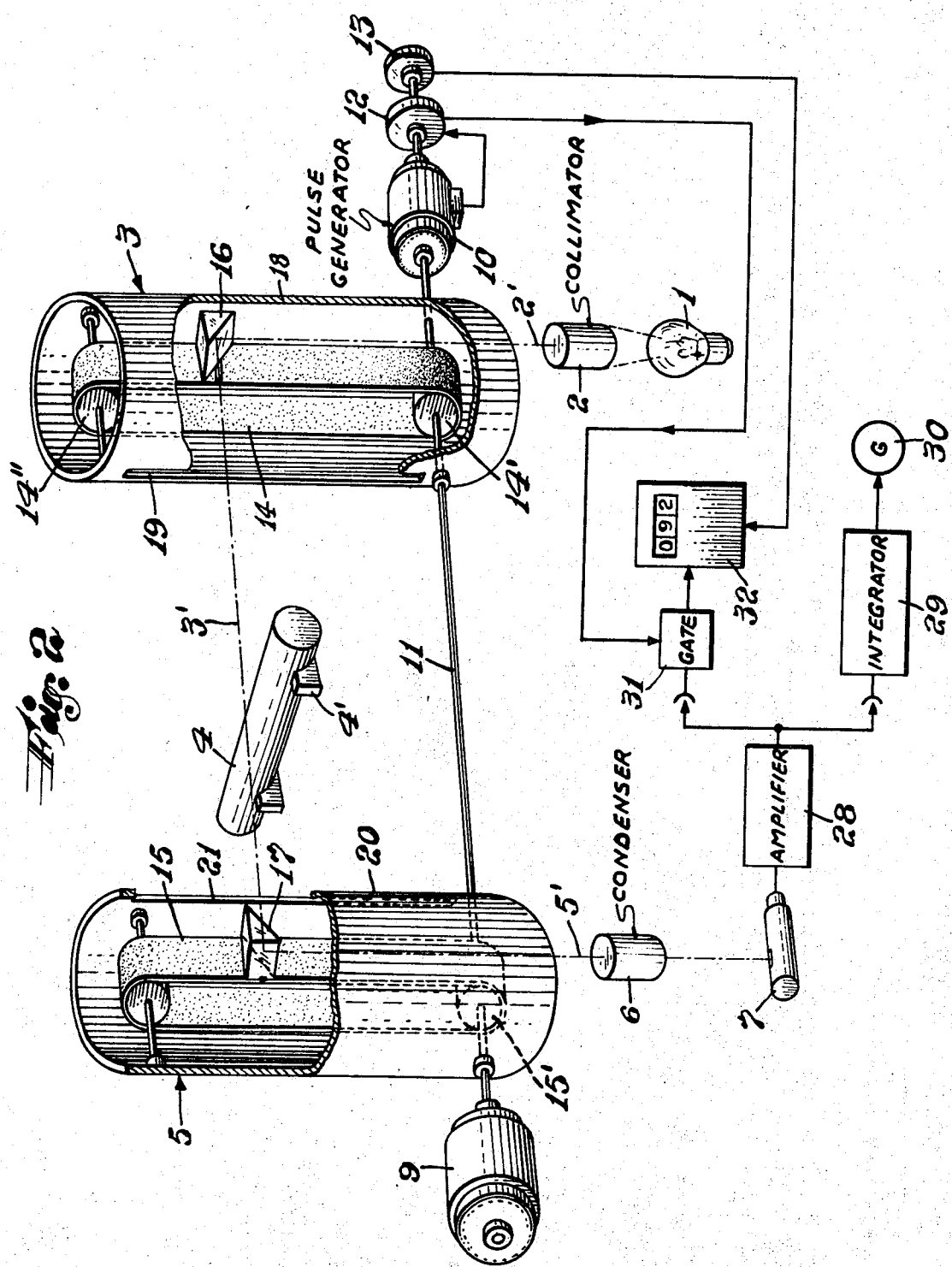

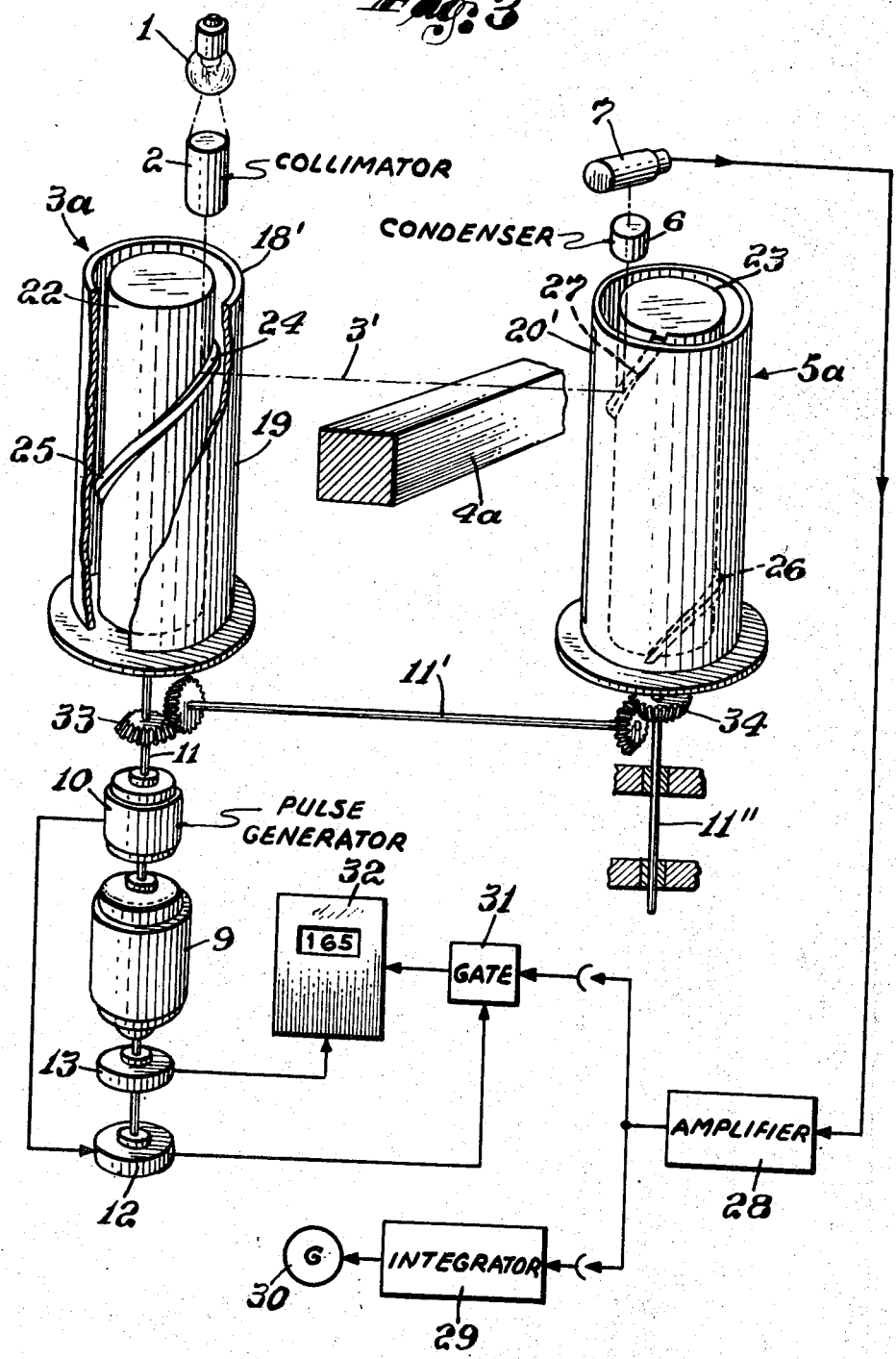

3,533,701
OPTICAL GAUGE
Václav Hrubý and Miloslav Dittrich, Plzen, Czechoslovakia, assignors to Závody V.I. Lenina Plzen, narodni podnik, Plzen, Czechoslovakia
Filed Sept. 8, 1964, Ser. No. 394,916
Claims priority, application Czechoslovakia,
Sept. 14, 1963, PV–5,089/63
Int. Cl. G01b *11/00*
U.S. Cl. 356—167     5 Claims

ABSTRACT OF THE DISCLOSURE

A moving object whose thickness is to be gauged is passed between two scanners, each having an opaque wall slotted in the direction of object thickness and provided with a movable mirror for transmitting a continuous light beam through the slots from one scanner to the other while the beam travels across the width of the object along the slots. The light source is provided with a collimator to narrow the beam, and the beam reflected by the mirror in the receiving scanner is trained by a condenser lens on a photoelectric cell provided with a readout. The two mirrors are synchronously driven. The length of the period during which the beam is obscured, is a measure of the thickness of the object.

---

The invention relates to gauges which permit dimensions of an object to be determined without actual contact between the gauge and the object, and particularly to an optical gauge.

The invention aims at providing an optical gauge which combines high precision with high operating speed so that exact measurements of a rapidly moving object may be obtained.

Another object of the invention is the provision of an optical gauge in which the position of the measured article relative to a light source and a cooperating light receiver need not be critically maintained.

A further object is the provision of an optical gauge in which a measuring light beam is moved during measurement in a reproducible manner.

With these and other objects in view, the optical gauge of the invention is characterized by two spaced scanning devices of which the first one has a light transmitting element arranged for movement in a predetermined path for transmitting a light beam from a light source in a direction transverse of the path of movement. The other scanning device includes a light receiving element which is movable transversely of the direction of the transmitted beam. The light receiving and transmitting elements are connected to a drive motor for synchronous movement in which they are maintained in alignment along the beam transmitted by the first scanning device. If an object to be measured is interposed between the two scanning devices, the beam transmitted by the first scanning devices is obstructed and cannot reach the second scanning device.

A signal generating device is connected to the second scanning device to emit a signal in response to the absence of light received by the light receiving element of the second scanning device from the light transmitting element of the first scanning device while the elements are being synchronously moved. A readout arrangement is connected to the signal generating device to produce readable indicia in response to the generated signal. The readout arrangement may be calibrated directly in units of lengths to indicate a dimension of an object supported between the two scanning devices for scanning by the beam from the light transmitting element.

Other features and many advantages of this invention will be readily appreciated as the same becomes better understood from the following description of preferred embodiments when considered with the attached drawing in which:

FIG. 1 is a diagram illustrating the general arrangement of the components in an optical gauge of this invention;

FIG. 2 shows apparatus for gauging a dimension of an object according to this invention, the view being partly in perspective, and partly conventional, portions of the structure being broken away to reveal internal features; and FIG. 3 shows another embodiment of the invention in a view corresponding to that of FIG. 2.

Referring now to the drawing in detail, and initially to FIG. 1, there is seen a light source 1 whose output is narrowed by a collimator 2 to a pencil beam 2' and is fed to a first mechanical scanner 3. The beam 3' transmitted by the first scanner rapidly travels transversely of its length during operation of the device, and thereby is interrupted from time to time by an object 4 interposed between the first scanner 3 and a second scanner 5. The beam 3' received by the second scanner is transmitted by the second scanner as a fixed beam 5' regardless of the position of the beam 3' when the latter is not obstructed by the object 4. The beam 5' passes through a condenser 6 which trains the beam 5' on a photoelectric cell 7. The electrical signal generated by the cell 7 in response to obstruction of the beam 3' by the object 4 is transmitted to a readout unit 8 in which it is transformed into readable indicia in a manner known in itself, and more fully described hereinafter. Correlation between the dimensions of the gauged object 4 and the period of obstruction of the beam 3' is provided by a pulse generator 10, such as a rotary switch, which is coupled to the drive motor 9 for synchronized operation of the two scanners 3, 5, the motion transmitting train connecting the pulse generator, the motor, and the scanners being conventionally represented by a drive shaft 11.

Specific embodiments of the invention incorporating the basic features shown in FIG. 1 are illustrated in FIGS. 2 and 3. As shown in FIG. 2, the light source 1 is an electric incandescent bulb whose output is limited by the collimator 2 to a narrow beam 2'. The beam enters the first scanner 3 through the open axial end of an opaque cylindrical wall 18. An endless belt 14 is trained within the wall 18 over two axially spaced pulleys 14' and 14" and carries a mirror 16 whose face intercepts the beam 2' and reflects it in a plane radial with respect to the axis of the wall 18 through an axially elongated slot 19 in the wall.

The pulley 14' is mounted on the output shaft 11 of the motor 9, and the mirror 16 thus travels along the slot 19 when the motor 9 is energized when the mirror is on that strand of the belt 14 which is nearer the viewer in FIG. 2. The reflected beam 3' is directed toward the second scanner 5 whose detail structure is identical with that of the scanner 3, a mirror 17 being mounted on a continuous belt 15 for rapid movement in a closed path within the cavity of a cylindrical wall 20 having an axial slot 21, movement of the mirror being actuated by the shaft 11 which is fastened to the drive pulley 15' of the belt 15.

The diameters of the pulleys 14', 15' are identical, and the mirrors 16, 17 are aligned in the direction of the beam 3' during operation of the motor 9 in such a manner that the beam 3' reflected from the mirror 16 passes sequentially through the slots 19, 21 and is received by the mirror 17. It is reflected by the latter in the axial direction of mirror movement to emerge from the open axial end of the wall 20 as a beam 5' which is trained by a condenser 6 on a photoelectric cell 7.

The scanners 3, 5 define therebetween a working space in which a cylindrical bar 4 is fixedly supported on cradles 4'. During the synchronized scanning movements of the mirrors 16, 17, the beam 3' is obstructed by the bar 4 over a length of mirror movement which is identical with the diameter of the bar in the illustrated position of the latter. The signal generated by the photoelectric cell is amplified and modified in a conventional manner in the amplifier 28, and then transmitted to a galvanometer 30 through an integrator 29. The galvanometer may be calibrated directly in units of length to indicate the diameter of the rod 4 in response to a signal from the cell 7 when the latter does not receive light through the condenser 6.

The output of the amplifier 28 is also being fed to a gate circuit 31 arranged in series with a pulse generator 10, a rotary switch 12, and a counter 32. The pulse generator 10 and the switch 12 are driven by the output shaft 11 of the motor 9, and a constant number of electric pulses are generated during each revolution of the shaft 11. Transmission of the pulses from the generator 10 to the gate 31 is blocked by the synchronized switch 12 in those positions of the mirrors 16, 17 in which the mirrors are out of alignment with the slots 19, 21. Pulses are transmitted from the switch 12 to the counter 32 by the gate 31 only when the beam 3' is obstructed by the rod 4. The number of the pulses which reach the counter 32 is thus uniquely correlated to the paths traveled by the mirrors 16, 17 while the beam 3' is intercepted by the rod 4.

The counter 32 is internally geared to read directly in units of length. The counter is operated by current supplied by a rotary switch 13 driven by the shaft 11 to energize the counter only in those positions of the mirrors 16, 17 in which a meaningful reading can be obtained, and to reset the counter to zero after each reading.

The apparatus illustrated in FIG. 3 is closely similar to that shown in FIG. 2 and operates in the same manner, the differences in structure being limited to the two scanners 3a, 5a and to their drives. The scanner 3a receives a narrow beam of light from the light source 1 through the collimator 2. The generally cylindrical, opaque, outer wall 18' of the scanner has an axial slot 19 for the purpose described above an encloses a coaxial cylindrical carrier 22 which is mounted on the output shaft 11 of the motor 9. A helical rib 25 on the carrier 22 has a mirror face 24 each element of which is inclined at an angle of 45° relative to the common axis of the carrier 22 and the wall 18' in an axial plane. The several mirror elements are sequentially aligned with respective longitudinal elements of the slot 19 during rotation of the carrier 22.

The scanner 5a has a slotted, stationary cylindrical outer wall 20' in which a cylindrical carrier 23 is arranged for coaxial rotation on a shaft 11". The carrier is equipped with a rib 27 having a mirror face 26 substantially identical with the corresponding elements of the scanner 3a. The shafts 11, 11" are connected for synchronized rotation by bevel gears 33, 34 and an intermediate shaft 11'.

The mirror faces 24, 26 are arranged on the respective carriers 22, 23 in such a manner that respective portions of the mirror faces aligned with the corresponding slots in the walls 18', 20' are also aligned with respect to each other along the beam 3' reflected from the mirror face 24, the beam being further received by the mirror face 26 and reflected toward the condenser 6 and the photoelectric cell 7 in a manner evident from the preceding description of corresponding portions of the gauge illustrated in FIG. 2. The pulse generator 10, rotary switches 12, 13, amplifier 28, integrator 29, galvanometer 30, gate 31, and counter 32 do not differ from elements of the aforedescribed embodiment of the invention, and do not require further explanation. The gauge is shown to measure a dimension of a square bar 4a.

It will be understood that the electrical and electronic circuits of the gauges have been illustrated conventionally only, and that structural detail familiar to those skilled in the art has been omitted in order not to crowd the drawing.

The gauges of the invention are relatively simple, yet they provide precise and rapid indications of the dimensions of an article supported between the two scanners, The invention permits the taking of measurements of objects which move relative to the gauge, and have been found advantageous for measuring the dimensions of sheet metal while the same travels at high speed between rolling mill stands arranged in tandem. Such measurements were not possible heretofore with gauges that do not contact the sheet material.

Obviously, may modifications and variations of the present invention are possible in the light of the above teachings. It is therefore to be understood that, within the scope of the appended claims, the invention may be practiced otherwise than as specifically described.

What is claimed is:

1. In an optical gauge, in combination:
   a source of a continuous light beam;
   first scanning means including first mirror means for receiving said continuous beam and transmitting the same in a direction transverse to said beam;
   second scanning means spaced from said first scanning means in said direction said second scanning means including second mirror means for receiving said transmitted beam and for reflecting the same;
   signal generating means for receiving the reflected beam and responsive to the absence of the reflected beam for generating a signal;
   drive means coupled to said first and second mirror means for synchronously moving said first and second mirror means and for thereby moving said transmitted continuous beam transversely of said direction while maintaining alignment of said first and second mirror means in said direction;
   one of said scanning means including an opaque wall formed with an elongated slot facing the other scanning means, a carrier mounted for movement relative to said wall longitudinally of said slot, said carrier being spaced from said wall in a direction away from the other scanning means, one of said mirror means being mounted on said carrier for movement therewith along said slot, said mirror means receiving said light beam, and said carrier being connected to said drive means for movement thereby; and
   readout means connected to said signal generating means for producing readable indicia of the absence of the reflected beam in response to the generated signal.

2. A gauge as set forth in claim 1, wherein said carrier being an endless belt member.

3. A gauge as set forth in claim 1, wherein said carrier mounted for rotation about an axis extending in the direction of elongatiton of said slot, one of said mirror means being mounted on said carrier and extending in a helix about siad axis, whereby respective portions of said mirror means are sequentially aligned with corresponding longitudinal portions of the slot, said mirror means being arranged to receive said light beam, and said carrier being connected to said drive means for rotation thereby.

4. A gauge as set forth in claim 1, wherein each of said scanning means includes an opaque wall formed with a continuous elongated slot facing the slot of the other scanning means, and a carrier mounted for movement relative to said wall longitudinally of said slot, said first and second mirror means being respectively mounted on said carriers for movement therewith along said slots, said carriers being connected to said drive means for synchronous movement thereby.

5. A gauge as set forth in claim 1, wherein each of said scanning means includes an opaque wall formed with a continuous elongated slot facing the slot of the other scanning means, and a carrier mounted for rotation about an axis extending in the direction of elongation of said slot, said carrier being spaced from said wall in a direction away from the other scanning means, each mirror means having a continuous reflecting face extending about the axis of the associated carrier.

References Cited

UNITED STATES PATENTS

| | | |
|---|---|---|
| 2,792,448 | 5/1957 | Deuth et al. _____ 350—6 X |
| 2,976,362 | 3/1961 | Stamps. |
| 3,312,140 | 4/1967 | Dokoupil. |

FOREIGN PATENTS

| | | |
|---|---|---|
| 715,631 | 9/1954 | Great Britain. |
| 601,843 | 8/1934 | Germany. |

RONALD L. WIBERT, Primary Examiner
P. K. GODWIN, Jr., Assistant Examiner

U.S. Cl. X.R.
350—289, 293, 299, 99; 178—7.6